INVENTOR.
KERMIT H. BURGIN
BY Herbert A. Minturn
Attorney

Dec. 12, 1967   K. H. BURGIN   3,357,110
CRIB FOR DRYING GRAIN
Filed June 5, 1965   2 Sheets-Sheet 2
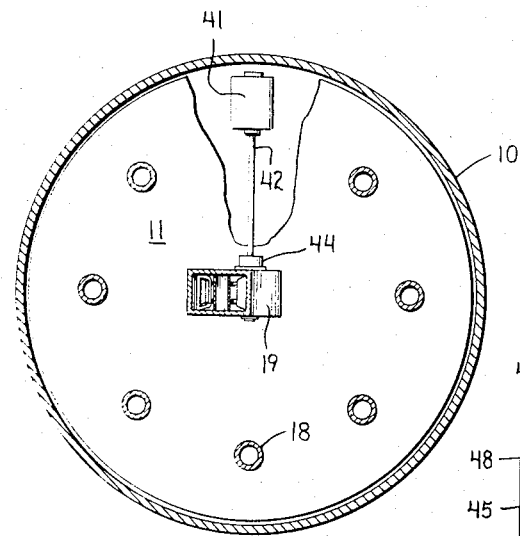
Fig. 2.
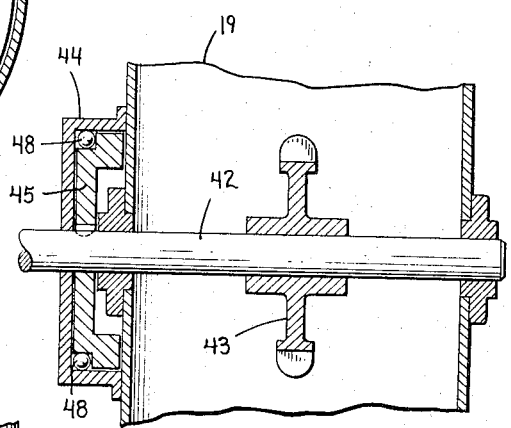
Fig. 5.
Fig. 3.
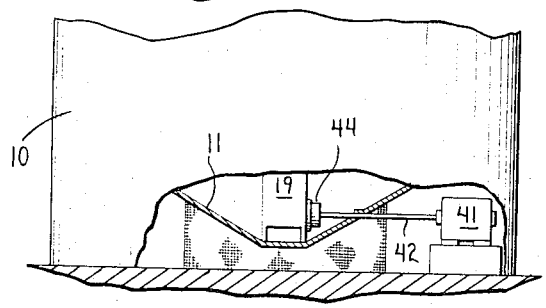
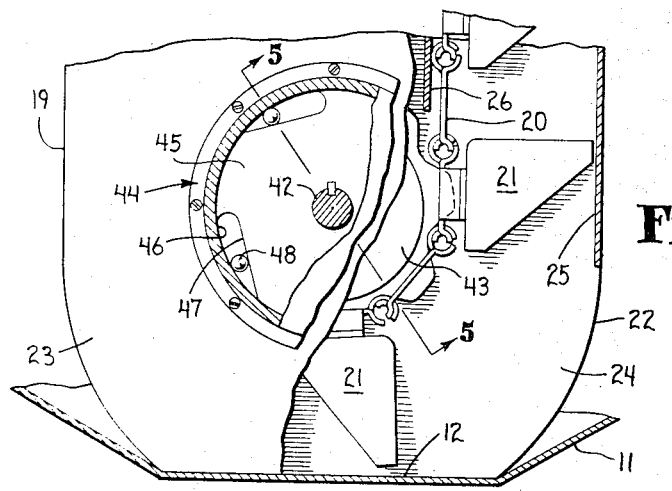
Fig. 4.
INVENTOR.
KERMIT H. BURGIN
BY Herbert A. Minturn
Attorney

United States Patent Office 3,357,110
Patented Dec. 12, 1967

3,357,110
CRIB FOR DRYING GRAIN
Kermit H. Burgin, R.R. 1, Box 212,
Boone County, near Whitestown, Ind. 46075
Filed June 2, 1965, Ser. No. 460,777
1 Claim. (Cl. 34—102)

ABSTRACT OF THE DISCLOSURE

A grain drying crib having a cylindrical wall with an inverted conical floor and an upper conical floor sloping downwardly and outwardly toward the wall terminating by a periphery spaced from the wall and forming therebetween an annular opening; and further having central grain elevating means lifting grain from the central zone of the floor and discharging the grain over the upper floor to allow the grain to cascade downwardly and fall through said opening.

---

This invention relates to a crib for holding grain such as shell corn, wheat, soybeans, and any and other grains. The invention involves a structure provided with a main holding container through which pass perforated tubes, and centrally through which passes an elevator for lifting grain from the bottom of the container and discharging it over a surface permitting the grain to fall back around the outer edges of the container. Preferably a windmill is employed to operate the elevator since there will be normally sufficient wind to form the operation required.

It is therefore a primary object of the invention to provide a structure of the nature above indicated wherein there will be substantially an automatic operation to elevate the grain from a central lower floor of the crib so that the grain may be discharged downwardly over a top conical surface for even distribution back around the outer edges of the crib.

With the advent of a corn combine wherein the corn is shelled in the field, the corn is normally in such a condition that it requires drying in order for it to keep in storage. The moisture content of the corn so harvested may run as high as 20% to 25% whereas this moisture content should be reduced to around a maximum of 13% to 14%.

Furthermore it is a primary object of the invention to dry grain in a crib without having to remove it therefrom. Sometimes the grain even when brought down to the desired moisture content will absorb moisture from the atmosphere when the humidity is high over a period of time, and therefore requires redrying.

I am aware of the fact that many attempts have been made to dry grain in a crib, but normally the reduction of moisture content was not sufficiently rapid or parts of the grain were left undisturbed and spoiled due to too high a moisture content locally.

These and many other objects and advantages of the invention including the low cost of the operation of drying as well as the low cost construction will become apparent to those versed in the art in the following description of one particular form of a structure embodying the invention, as illustrated in the accompanying drawings, in which FIG. 1 is a central vertical section through a structure embodying the invention;

FIG. 2 is a transverse section taken on the line 2—2 in FIG. 1;

FIG. 3 is a detail in vertical elevation and partial section of the base end of the crib;

FIG. 4 is a detail on a larger scale of means for preventing reverse travel of the elevator chain or belt as viewed from a side opposite from that shown in FIG. 1; and FIG. 5 is a detail on an enlarged scale of the lower end of the elevator and in partial section.

Figure 1:
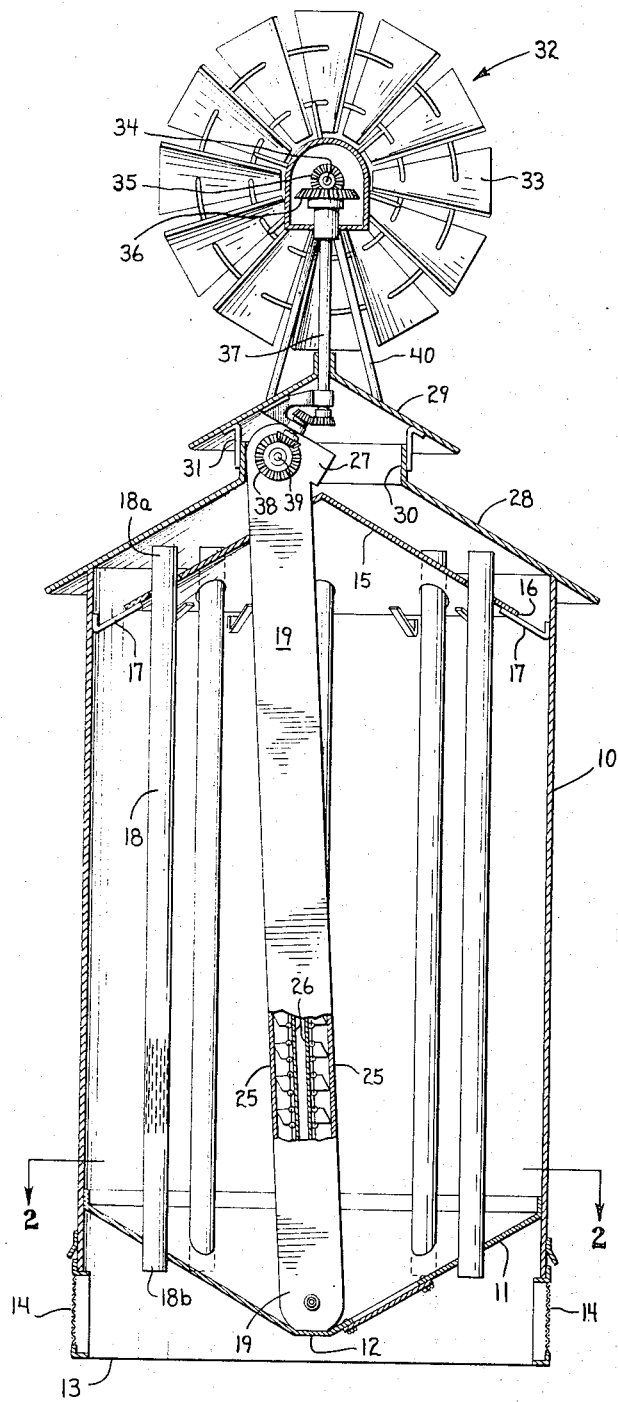

A cylindrical wall, preferably metal, designated by the numeral 10 is employed to have an internal diameter of such extent as will hold the desired quantity of grain. This wall 10 has a floor 11 therein, being in inverted conical shape as indicated in FIG. 1, the center portion 12 being preferably at a slight distance above the ground level 13. Between the outer margin of the floor 11 where it is in contact with the wall 10, there are provided one or more openings 14 preferably screened to prevent entrance of trash and rodents, as well as to permit entrance of air.

In the upper end portion of the wall 10 there is fixed a conical floor 15, centrally of the wall 10, but having its marginal edge 16 spaced inwardly from the wall 10. That is the overall diameter of the edge 16 is less than the internal diameter than of the wall 10. This floor 15 is herein shown as being supported by a plurality of brackets 17 fixed to the wall 10.

A plurality of vertically disposed tubes 18 are fixed to extend by opposite end portions 18a and 18b through the lower floor 11 and the upper floor 15 as indicated in FIG. 1. Each of these tubes 18 are perforated so as to permit passage of air into and out of the tubes. The number and diameters of these tubes 18 may be varied if desired depending upon the nature of the grain to be stored. These tubes 18 are preferably spaced to have their axes in a circumferential line around the floors, and are spaced from the inside of the wall 10 a distance which is not critical. However this distance should be less than the diametrical spacing of opposite tubes.

An elevator generally designated by the numeral 19 has a generally rectangular housing throughout and carries a chain fitted with spaced apart buckets, the chain being designated by the numeral 20. This conveyor 19 is of the usual and well known type. The lower end of the elevator 19 is open between its side walls 22 and 23, these side walls resting on the central portion 12 of the floor 11. Normally there would be opposite openings between the side walls 22 and 23, but only one opening 24 is herein illustrated. Grain in the elevator on the floor 11 will slide theredown and in part enter through the opening 24 to flow into the lower end of the elevator 19. The chain 20 and its buckets 21 are herein shown as moving downwardly on the right hand side of the elevator. As these buckets 21 are carried by the chain 20, they scoop up the grain which enters through the opening 24 and carry it upwardly within the elevator to the top end, between the outside 25 and the inside backup board 26.

The grain lifted by the buckets 21, one bucket following another, is discharged through a spout 27 centrally of the upper floor 15 so that the grain will slide by gravity downwardly over the floor in substantially all directions and finally discharged over the edge 16 to fall downwardly within the housing 10 on top of that mass of grain therebelow which is being elevated and circulated. The upper end of the housing 10 is provided with a frustoconical roof 28 spaced above the floor 15, topped by a centrally disposed cupola 29. The roof 28 is provided with a cylindrical upturned flange 30 over which brackets 31 sit to support the cupola 29 at a spaced distance above the top edge of the flange 30 to permit air passage therebetween. No air travels laterally of the housing 10 under the lower edge of the roof 28, and the only escape for air from the crib within the wall 10 is upwardly and outwardly through the annular space provided between the cupola 29 and the flange 30. The elevator 19 at its upper end extending into the cupola 29 at a short distance. The ends of the perforated tubes 18 terminate below the roof 28 so that air may travel upwardly from through the screen openings 14 in the wall 10 through these tubes and discharge into the space under the upper roof 28 and then travel outwardly under the cupola over the top of the flange 30.

The elevator 19 may be driven by different sources of motive power. One form which is preferred is that of a windmill generally designated by the numeral 32 which is constructed in the usual manner to have a plurality of angled blades 33 which turn a shaft 34 under the influence of wind striking those blades. In the form herein shown, the shaft 34 is provided with a bevel gear 35 which is in constant mesh with a larger bevel gear 36 secured to a shaft 37 which extends downwardly through the central portion of the cupola 29 to engage through gears with the gear 38 which is fixed on the upper shaft 39 which supports the upper porton of the chain 20. The windmill 32 is of the usual construction which has a tail or wind operated vane to keep the blades 32 approximately crosswise of the prevailing wind. The windmill structure is mounted by suitable supporting rods 40 fixed to the cupola 29. Thus when the wind blows, the chain 20 is set into operation to carry the buckets upwardly and bit by bit transfer all of the grain in the crib from the bottom portion to the top portion. Air may be introduced under pressure by any suitable source of power (not shown) into the space under the floor 11, such as through one of the openings 14 so that this pressurized air may flow upwardly and discharge from the upper ends of the tubes 18, thus aiding in carrying off more moisture if required.

In localities where the wind is not sufficient in numbers of days, the elevator may be driven from its lower end as suggested in FIG. 2 where a motor 41 is mounted below the floor 11, FIG. 3, and a motor driven shaft 42 passes through the floor 11 to drive the lower sprocket 43 around where the chain 20 is trained.

In either case of power application, the buckets are prevented from dropping back downwardly when they are loaded when the power is shut off by any suitable means, herein shown as by an overrunning clutch generally designated by the numeral 44. The usual, simple form of overrunning clutch is indicated in FIGS. 4 and 5 where there is the star wheel 45 running within a cylinder 46, and having angularly aligned notches 47 entering its periphery with balls or rollers 48 being carried in each one of the notches, the balls 48 being free to roll into the portions of the notches 47 which are of greater radial dimension than the diameters of the balls in which case the wheel 45 does not become engaged with the cylinder 46 so that the shaft 42 is allowed to be free to turn in a counterclockwise direction as indicated in FIG. 5. Should there be a reverse action, the balls 48 will roll into the more restricted zones of the notches 47 and wedge between their surface and the cylinder 46 to prevent any travel of the wheel 45 and consequently of the chain 20. The fact that there is normally a movement of air coming upwardly through the tubes 18 and into the space between the floor 15 and the roof 28 and shows that the grain falling from the spout 27 is subjected to that moving air as it falls in a very thin layer downwardly over the floor 15. As a matter of fact, the movement of the grain downwardly over the floor 15 is that of almost individually spaced apart grains since each bucket 21 has a quite limited capacity for carrying grain, and only one of these buckets dumps at a time, and the travel of the chain 20 is dependent upon the vagaries of the wind strength.

In any event, the combination of the various elements in the crib formed within the housing 10 and the power drive are quite effective in preventing spoilage of the grain due to excess moisture.

While I have herein shown and described my invention in the one particular form, it is obvious that structural changes may be employed without departing from the spirit of the invention, and I therefore do not desire to be limited to this precise form beyond the limitations which may be imposed by the following claim.

I claim:

Means for drying grain in a crib comprising:

an enclosing cylindrical wall defining a cylindrical vessel of constant diameter from top to bottom;

an inverted conical lower floor closing off the lower end of the wall;

a conical top floor across an upper portion of the wall and having an annular opening between its periphery and said wall;

a grain elevator disposed approximately centrally of the wall and said floors;

said elevator having a grain pickup at said lower floor and discharging centrally over said top floor allowing the grain to flow under influence of gravity over the top floor downwardly to said opening adjacent the inner side of said wall during the elevator pickup of grain at the center of the lower floor;

power means operating said elevator;

said lower floor being spaced above the bottom of said wall to provide an air space therewithin under the floor;

a plurality of perforate walled tubes having lower end portions extending downwardly to said lower floor and opening into said air space, and having upper end portions extending through said top floor discharging thereabove;

said wall having air inlet openings therethrough below said lower floor; and said grain travelling along the outer sides of said tubes during movement of the grain set up by said elevator.

References Cited

UNITED STATES PATENTS

| | | | |
|---|---|---|---|
| 90,847 | 6/1869 | Johnson et al. | 34—174 X |
| 422,781 | 3/1890 | Hiller | 192—45 |
| 633,221 | 9/1899 | Sorlle et al. | 34—102 X |
| 1,377,662 | 5/1921 | Brown | 98—55 |
| 1,601,224 | 9/1926 | Reavis | 34—102 |
| 1,620,033 | 3/1927 | McMahon | 198—232 X |
| 1,954,493 | 4/1934 | Rothgarn | 198—232 X |
| 2,259,366 | 10/1941 | Dunlop | 198—232 X |
| 2,342,528 | 2/1944 | Carbaugh | 98—55 |
| 2,509,175 | 5/1950 | Sohanin | 34—102 |
| 3,078,590 | 2/1963 | Batterton et al. | 34—102 |
| 3,087,591 | 4/1963 | Whitney et al. | 192—45 |
| 3,221,850 | 12/1965 | Bacon | 192—45 |

FREDERICK L. MATTESON, JR., *Primary Examiner.*

A. D. HERMANN, *Assistant Examiner.*